United States Patent [19]

Yamaguchi

[11] 3,965,047
[45] June 22, 1976

[54] ELECTRICAL RESISTANT FLUID-PERMEABLE HEAT GENERATING MEMBER AND METHOD OF PRODUCING THE SAME

[75] Inventor: Takeshi Yamaguchi, Tokyo, Japan
[73] Assignee: Ernest K. Cleland, Milwaukee, Wis.
[22] Filed: Aug. 15, 1974
[21] Appl. No.: 497,821

Related U.S. Application Data

[63] Continuation-in-part of Ser. No. 260,133, June 6, 1972, Pat. No. 3,828,161.

[30] Foreign Application Priority Data

July 20, 1971 Japan.............................. 46-54014

[52] U.S. Cl................................ 252/503; 252/504; 252/516; 428/450; 428/457
[51] Int. Cl.². ......................................... H01B 1/04
[58] Field of Search................... 252/503, 504, 516; 219/376, 375; 428/450, 457

[56] References Cited
UNITED STATES PATENTS 3,153,636  10/1964  Shanta et al................... 252/504 X

*Primary Examiner*—Benjamin R. Padgett
*Assistant Examiner*—E. Suzanne Parr
*Attorney, Agent, or Firm*—Hill, Gross, Simpson, Van Santen, Steadman, Chiara & Simpson

[57] ABSTRACT

A fluid-permeable electrically energized heat generating member of a desired shape, such as a rectangular brick, is formed by (1) mixing (a) about 87 to 94 percent by weight of a first material which contains about 80 to 95 percent by weight of SiC and about 5 to 20 percent by weight of a mixture of carbonyl iron, nickel-chromium alloy, cobalt and carbon; (b) about 5 to 10 percent by weight of a second material which contains about 75 to 95 percent by weight of an organic binder material, such as a linseed oil and about 5 to 25 percent by weight of a foaming material, such as methylene diphenyl isocyanate; and (c) about 0.2 to 3 percent by weight of a third material selected from the group consisting of polystyrene preformed powder, sawdust, wood flour, starch, corn flour and mixtures thereof; (2) placing the resultant mixture in a select mold and subjecting the mold to curing conditions sufficient to provide self-sustaining members composed of the foregoing mixture; (3) removing the self-sustaining members from the molds and subjecting them to a heat at a temperature in the range of about 250° to 350° F. for a period of time sufficient to render the bodies electrically conductive; (4) sintering the electrically conductive bodies as by passing a controlled electrical current through each member until a temperature in the range of about 1000° to 1600° F. is achieved within the member; and (5) metallizing terminal sides of each member, as by applying an aluminum layer thereon for contact with a suitable electrical circuit.

6 Claims, 2 Drawing Figures

ELECTRICAL RESISTANT FLUID-PERMEABLE HEAT GENERATING MEMBER AND METHOD OF PRODUCING THE SAME

CROSS-REFERENCE TO RELATED APPLICATION

This is a continuation-in-part of U.S. Ser. No. 260,133, filed June 6, 1972 now U.S. Pat. No. 3,828,161, which is incorporated herein by reference.

BACKGROUND OF THE INVENTION

1. Field of the Invention

The present invention relates to new and improved electrically energized heat generating members for heating various gaseous and liquid fluids and to a method of making such members.

2. Prior Art

Various apparatuses and heat generating members for heating various fluids are known. However, presently known devices are uneconomical to operate and-/or manufacture and are generally unsuitable for uniform heating of a large volume of fluid to an elevated temperature. Devices of this nature are shown, for example, in U.S. Pat. Nos. 1,121,743; 1,277,657; 1,766,068; 1,880,306; 2,731,541; 2,837,623; 3,153,636; 3,268,080; 3,311,525; 3,459,924; 3,477,827; and 3,688,083. However, these prior art devices utilize expensive materials, cumbersome controls, complex methods of manufacturing, etc. rendering them unsatisfactory from technological and economical viewpoints.

SUMMARY OF THE INVENTION

The invention provides a simple highly economical, large capacity, electrically energized heat generating member and a method of producing the same.

In accordance with the invention, a fluid-permeable electrically energized heat generating member of desired shape, such as a rectangular brick, is formed by molding a body mainly composed of silicon carbide in a manner to provide substantially uniform porosity and electrical conductivity therein. Electrical current can be passed through such bodies so as to heat the body by electrical resistance and when a fluid is passed through such a heated porous body, it becomes heated. A plurality of heat generator members may be used in various series mounted relationships.

A fluid-permeable electrically energized heat generating member of the invention is formed by (1) mixing (a) about 87 to 94 percent by weight of a first material which contains about 80 to 95 percent by weight of SiC and about 5 to 20 percent by weight of a mixture of carbonyl iron particles, nickel-chromium alloy particles, metallic cobalt particles and carbon particles; (b) about 5 to 10 percent by weight of a second material which contains about 75 to 95 percent by weight of an organic binder material, such as a linseed oil and about 5 to 25 percent by weight of a foaming material, such as methylene diphenyl isocyanate; and (c) about 0.2 to 3 percent by weight of a third material selected from the group consisting of polystyrene preformed powder, sawdust, wood flour, starch, corn flour and mixtures thereof; (2) placing the resultant mixture in a select mold and subjecting the mold to curing conditions sufficient to provide self-sustaining members composed of the mixture; (3) removing the self-sustaining members from the molds and subjecting them to a heat at a temperature in the range of about 250° to 350° F. for a period of time sufficient to render the bodies electrically conductive; (4) sintering the resultant members at a temperature in the range of about 1000° to 1600°F. for a period of time sufficient to burn out substantially all of the organic material from the member and achieve the desired degree of porosity; and, optionally, (5) metallizing terminal sides of each member, such as by applying an aluminum layer thereon for connection with a suitable electrical circuit.

DESCRIPTION OF THE PREFERRED EMBODIMENTS

Figure 1:
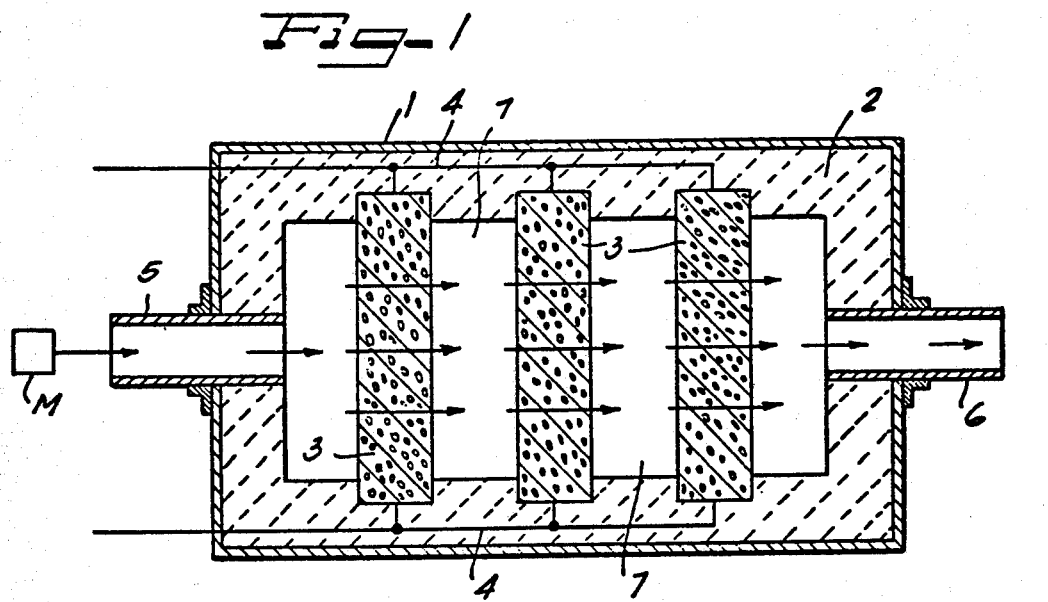
FIG. 1 is a schematic longitudinal view of an embodiment of an apparatus which includes heat generating members formed in accordance with the principles of the invention.

In accordance with the principles of the invention, fluid-permeable heat generating members are provided which generate heat by virtue of electrical resistance to electrical current passing therethrough. Each heat generating member is comprised of a mixture which includes a major proportion of metallic and/or non-metallic electrically conductive particles composed of, for example, silicon carbide, carbon, nickel-chromium alloy, carbonyl iron, low carbon ferro-chrome alloys, nickel, iron, chromium and similar materials; a minor proportion of a thermally decomposable porosity control material, such as sawdust, starch, plastic and similar materials; a minor proportion of an organic binding material, such as linseed oil; and a minor amount of a foaming agent, such as an isocyanate, for example, methylene diphenyl isocyanate. The foregoing mixture is formed or molded into a desired shape member, for example, as a rectangularly-shaped brick of any desired size and is then cured under certain conditions to provide a rigid electrically conductive member which is then sintered so as to remove substantially all organic material therefrom and provide a desired degree of fluid-permeability to the ultimately attained member. Once so formed, appropriate electrical contacts, such as metal layers, may be applied at desired locations of each heating member for connection with an appropriate electrical circuit.

The mixture of materials forming the heat generating members of the invention is economical and may be selected in accordance with the particular fluid to be heated. Care should be taken against oxidation, combustion, chemical change, corrosion, etc. of the materials.

A heat generating member of the invention must be electrically conductive so that the electrical resistance to the passage of electrical current therethrough generates heat. Further, a heat generating member of the invention must have a fairly uniform porosity so that a fluid, such as a gas or a liquid, may readily pass through the body of the member and be uniformly heated. For example, a fluid to be heated, such as air, may be heated to about 1000° C. with the aid of heat generating members produced in accordance with the principles of the invention. Further, uniform and constant temperature ranges between 500° to 600° C. and particularly lower temperatures, can be obtained, even at temperatures below about 200° C.

In a preferred embodiment, the composition of the starting materials used in forming a heat generating member in accordance with the invention, comprises a mixture of (a) about 87 to 94 percent by weight of a first material which contains about 80 to 95 percent by weight of SiC and about 5 to 20 percent by weight of a mixture of carbonyl iron particles, nickel-chromium alloy particles, metallic cobalt particles and carbon particles; (b) about 5 to 10 percent by weight of a second material which contains about 75 to 95 percent by weight (i.e. about 3 to 9.5 percent by overall weight of mixture) of a linseed oil base binder and about 5 to 25 percent by weight (i.e. about 0.2 to 3 percent by overall weight of mixture of a methylene diphenyl isocyanate; and (c) about 0.2 to 3 percent by weight of a third material which is selected from the group consisting of polystyrene preformed powder, sawdust, wood flour, starch, corn flour and mixtures thereof.

The process of manufacturing the heat generating members of the invention comprises a number of sequential steps, the first of which comprises mixing the above first, second and third materials into a substantially homogeneous mass, preferably by mixing the first material for about 5 to 10 minutes and then adding the third material to the first material while continuing mixing for an additional 1 to 3 minutes and then adding the liquid organic binder (the second material) to the above dry mass and mixing for about 2 to 3 minutes and then adding the isocyanate while continuing mixing for a further 1 to 2 minutes so as to achieve a moldable mass.

The second step comprises placing the above moldable mass in a selected mold, preferably within about 45 minutes after the first step and either allowing the molded mass to self-cure at room temperature for about 90 to 180 minutes after the first step, i.e. about 45 to 85 minutes after placing the mixture in the mold, or placing the filled molds in an oven to achieve a quick cure within about 5 to 10 minutes after placement of the mass in the molds by heating the oven to a temperature of about 200° to 300° F.

The third step comprises removing the self-cured members or bricks from the molds and post-curing them in an oven at about 250° to 350° F. for about 45 to 75 minutes, at which time the post-cured members are electrically conductive and hav a mechanical strength sufficient to withstand about 50 to 150 pounds per square inch.

The fourth step comprises sintering the post-cured members either by passing an electrical current through each member whereby the current is controlled so that an initial voltage of about 10 to 15 V is provided, which is raised about 10 to 15 V each 30 minutes until a voltage of about 80 to 120 V is achieved in about 4 hours and the temperature of each member is about 1000° to 1600° C. and these conditions are maintained for 2 hours; or by placing the post-cured bricks in an oven which is gradually heated to about 1600° C. and maintaining the members under these conditions for about 3 hours. The foregoing sintering process burns off substantially all of the organic materials, i.e. the second and third materials in the members, so that a substantially uniform porosity is achieved.

The fifth and optional step comprises metallizing select sides, i.e., terminal sides, of each member by applying a conductive metal layer, preferably composed of aluminum. The metal layer may then be connected to a suitable electrical circuit which may be regulated to feed an electrical current through the members so as to heat them to a desired temperature in an environment of use.

The heat generating members formed in accordance with the principles of the invention are useful for heating large volumes of a fluid, such as air or another gas, or water or another liquid. The heat generating members are positioned within a fluid stream flow and the fluid is caused to flow through one or more heat generating members, which have a good uniform fluid-permeability and which are heatable to a desired temperature via electrical current so that the fluid is readily and uniformly heated. The elevated temperature to which a fluid is heated depends upon the temperature to which the heat generating members are heated. A uniform and constant heating of a fluid is obtained when the heating conditions of the heat generating member or members and the conditions for the flow of fluid therethrough are maintained constant.

Contrary to prior art heating which, because of the fact that a fluid is heated within a chamber by means of electrodes or combustion of a fuel, which tends to produce unequally heated fluid wherein one always encounters temperature variations and difficulties in the operation and installation or in the equipment, the heat generating members of the invention enable a fluid to be uniformly heated while passing through the minute and substantially uniform pores, perforations or passages through each respective heat generating member. An especially advantageous feature of the invention is that the operation of associated equipment is relatively simple, enabling the heat generating members to be maintained at a controlled temperature so as to heat a fluid to a desired elevated temperature.

The heat generating members of the invention may be associated with a heating apparatus, such as illustrated at FIG. 1, wherein a housing 1 is provided with a lining 2 of a refractory material or the like. At least one fluid-permeable heat generating member 3 is provided, although in this instance three such members are shown equally spaced from one another and electrically connected in parallel by means of conductors 4, so that a current from an electrical source (not shown), may be passed through the heat generating members. The housing 1 is provided with a fluid inlet 5 at one end and with a fluid outlet 6 at the other end and within the lining 2, between the inlet and outlet, a heating chamber 7 is defined, across which the heat generating members 3 are mounted so that all fluid traveling between the inlet and outlet must pass through the heat generating members or member, as the case may be. In a preferred form, the heat generating members 3 are panels, plates or cakes of uniform porosity and uniform heating characteristics so as to attain a uniform heating of the fluid, whether gas or liquid, for which the apparatus is designed.

With the described apparatus, electrical current is passed through the heat generating members 3 so as to heat these members to an elevated temperature by virtue of the heat generated by the electrical resistance of the members to the current. Fluid, such as air or liquid, is introduced through the inlet 5 into the heating chamber 7. The fluid is passed through the respective heating generating members 3 as indicated by the arrows, and is heated by the heat of the heat generating members. The heated fluid then leaves through the outlet 6 to a point of use.

It will be appreciated, of course, that a suitable fluid impelling, propelling, forcing, guiding means M, such as a compressor, blower, fan, pump, impeller or the like, will be employed in motivating the fluid through the respective heating devices.

While in the embodiment of FIG. 1, three heat generating members 3 have been shown in spaced relation with respect to each other along the elongated passage 7, the number of heat generating members may be appropriately determined to meet the particular conditions for which the apparatus is to be used. Fluid-permeability of the heat generating members, allocation of installation thereof, dimensions, etc. may be appropriately determined in accordance with the intended use. The most important consideration is that the heat generating members be designed and arranged such that they are enabled to heat a required volume of fluid to a desired elevated temperature at a required speed. At least that part of each of the heat generating members 3 which is exposed to the space within the heating chamber 7 is preferably designed to assure uniform temperature generation throughout such exposed portions, so as to avoid any differences which might otherwise be caused in temperature of the mass of fluid passing through any part of the heat generating members. In other words, uniformity of heating is a prime consideration as the fluid passes through the heat generating members or any portion thereof.

Figure 2:
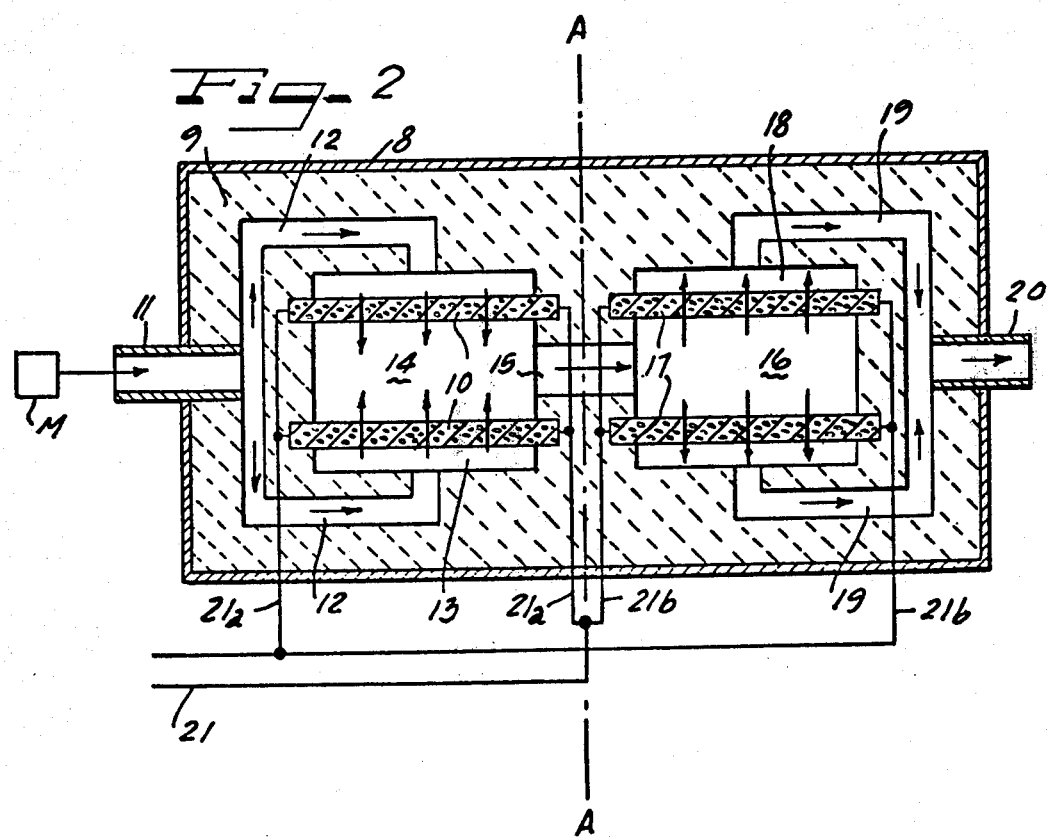
FIG. 2 is a view similar to that of FIG. 1 of another embodiment of an apparatus which includes heat generating members formed in accordance with the principles of the invention.

In the embodiment shown at FIG. 2, a multi-stage heating is provided in a somewhat different manner from that illustrated at FIG. 1. The apparatus of FIG. 2 comprises a plurality of heating devices arranged serially and this may be as separate connected units or a plurality arranged within a common housing 8 provided with a heat-resistant lining 9, which may be a refractory material or the like. The dot-dash line AA represents a line of demarcation separating the two-stage sections represented in FIG. 2. This embodiment is able not only to heat a fluid by a first heating device and further heat the initially heated fluid by a second heating device so that much more uniform and equal heating of the fluid can be effected than may be possible by the embodiment of FIG. 1, but also enables the first and second heating devices to be individually heated by different electrical currents so that the first heating device in the series performs a pre-heating of a fluid to an elevated temperature and then the second or additional heating device performs final heating of the fluid to further elevated temperatures, namely, a progressive heating of the fluid where this is desirable. It will be appreciated, of course, that the apparatus may be provided with several heating stages, i.e. more than the two stages illustrated.

In the first heating stage portion of the apparatus of FIG. 2, fluid enters the heat generating members 10 through an inlet 11 located at one end of the section. The inlet communicates with one or more, in this instance, two, fluid passages 12 leading into a chamber 13 wherein the heat generating members 10 are located. In this instance, the heat generating members are of the same general construction as that shown in FIG. 1, and a number of optional arrangements are feasible. For example, a plurality of plate-like heat generating members may be provided dividing the chamber 13 into a plurality of areas, one of which is adjacent to the delivery end of each of the passages 12 and the heat generating elements or members 10 are spaced in general conforming relation to one another to define a heating chamber 14 therebetween into which the fluid being heated in passing through the heat generating members and is commingled and further heated by radiant heat from the generating members. Instead of separate platelike elements, the heat generating members 10 may be in the form of a hollow tube of cylindrical, annular or square or other desirable geometric cross-sectional shape, defining therein the heating chamber 14. In any event, all of the fluid delivered by the passages 12 to the chamber 13 must pass through a heat generating member or members 10 and be heated thereby while passing to the heating chamber 14, as indicated by the directional arrows.

From the passage 14, the heated fluid leaves by way of an outlet passage 15 from the chamber 14, as indicated by the directional arrow and this passage may also serve as an inlet into a further heating chamber 16, within the second stage section or heating device of the apparatus, on the other side of the dividing line AA from the first stage heating device. While the second stage heating device may be structurally the same as the first stage section or device, flow of the fluid to be further heated upon entry into the chamber 16 is in a reverse direction to the flow in the first stage section. Thus, the fluid leaves the chamber 16, as indicated by the directional arrows, through heat generating members 17, which may be in the form of a plurality of plates or a tubular heat generating member structure as preferred, and is further heated in passing therethrough into a fluid chamber 18 outside of the generating members 17. It will be understood, of course, that the heat generating members 17 are substantially identical in composition and function to the heat generating members 10 and 3. From the chamber 18, now sequentially heated fluid leaves by way of one or more, in this instance two, passages 19 and exhausts from the apparatus through an outlet 20, from where it is conducted to a point or place of demand or use.

Electrical energy is supplied from a suitable electrical current source (not shown) through suitable conductors 21 to respective branches 21a connected to the opposite ends of the heat generating member or members 10, which are of the resistance heater type. Similarly, electrical lead branches 21b are connected to the heat generating member or members 17, which are also of the resistance heater type. If preferred, desirable or necessary, the potential may be varied in respect to the heat generating members 10 and 17 to provide for successive stage heating of varied intensity, for example, wherein the heat generating member or members 17 generate a higher temperature than the heat generating member or members 10.

A suitable fluid propelling means M, such as a compressor or fan may be provided for motivating a fluid through the respective heating devices.

Heating of a fluid with unusual efficient uniformity, as well as successive stage differential heating, can be accomplished with an apparatus such as illustrated in FIG. 2.

In accordance with the invention, heating is effected not only by direct contact of the fluid as it passes through the porous, permeable heat generating members, but is also heated by radiant heat serving to preheat the fluid upstream and additionally heat the same downstream from the members.

Although the heat generating members may be permanently installed in appropriate devices, such as illustrated at FIGS. 1 and 2, they may also be mounted in replaceable relation within such apparatuses. For this purpose, any preferred access door, panel, closure, separable connection, etc. may be provided in the construction of the apparatus as preferred. In any event, the heat generating members are positioned across the flow path of the fluid as permeable heating barriers through which all of the fluid must pass in traveling through the respective devices. The permeable electrical resistance heat generating members 3, 10 and 17 are mounted in suitable electrically insulated relation to a respective housing. For this purpose, the dielectric refractory linings 2 and 9 are well suited for supporting the members directly, but other insulating means, thermal or electrical, may also be employed.

With the foregoing general discussion in mind, a number of detailed examples are presented to further illustrate to those skilled in the art the manner in which the invention may be carried out. However, it is to be understood that the examples are not to be construed as limiting the scope of the invention in any way.

EXAMPLE I

A material mixture was prepared by adding 100 pounds of granular silicon carbide, 5 to 10 pounds of powdered carbonyl iron, 3 to 5 pounds of powdered metallic nickel, 2 to 3 pounds of powdered low carbon ferro-chrome alloy, 0.2 to 3 percent by weight of wood flour (sawdust) or polystyrene particles to a suitably large container having an agitator therein. This mixture was agitated for 1 to 2 minutes, or more, if desired, to produce a uniform dry mixture of the foregoing materials.

Then, 100 pounds of the foregoing dry mixture of materials was placed in another agitator equipped container, along with 3 to 5 percent by weight of a linseed oil base binder (for example, as available under the trade name "OIL-NOBAKE" binder) and about 20 percent by weight of binder of an isocyanate (preferably methylene diphenyl isocyanate) and this mixture was subjected to agitation for about 3 to 5 minutes. Thereafter, the resultant mass was placed into suitable molds (metal or wood boxes) and allowed to self-cure at room temperature for about 1 to 1½ hours. Then the formed panels or bricks were removed from the molds and at this stage exhibited electrical conductivity characteristics. Similar results were also obtained by placing the filled molds in an oven and heating the oven to a temperature of about 250° F. for about 5 to 10 minutes.

Thereafter, the self-sustaining bricks were connected on opposite sides thereof to an electrical source, which had a controllable voltage, and provided with initial voltage of about 5 to 10 volts. The electrically connected bricks were then placed in a protective environment, for example, in a refractory container or in dry Foundry sand, to prevent oxidation of materials during the sintering step.

The electrical current passed through each brick was controlled so that the voltage thereof was raised 10 to 15 V each hour unit a voltage of about 80 to 120 V was attained. At this time, the temperature within each brick was about 800° to 1000° C. (1500° F. to 1800° F.) and these conditions were maintained for about 1 to 3 hours. Then the electrical current was disconnected and the bricks removed from the protective environment. Upon inspection, it was noted that all or substantially all organic material within the bricks was burned out so that a uniform porosity was attained and that the metallic materials within the bricks were sintered together. The resultant bricks were uniformly porous to fluid (water) flow and comprised good heating members. For improved electrical contact, suitable electrodes, for example, layers of aluminum, may be applied to opposing sides of the bricks, although this is not absolutely required. In this manner, the bricks are readily incorporated within a suitable electrical circuit, such as illustrated at FIGS. 1 and 2.

EXAMPLE II

The size of a desired batch of starting materials was determined on the basis of weight and a first material (metallic) mixture comprising about 87 to 94 percent by weight of the starting materials was prepared. This was accomplished by mixing about 85 to 90 percent by weight of silicon carbide particles, such as available under the registered trademark "CARBORUNDUM" and about 10 to 15 percent by weight of a mixture of carbonyl iron particles, nickel-chrome alloy particles, metallic cobalt particles and carbon particles.

Then a second material mixture comprising about 5 to 10 percent by weight of the starting materials was provided. This was accomplished by determining the amount of an organic liquid binder, for example, a linseed oil binder available under the trademark "OIL-NOBAKE" binder and the amount of isocyanate, for example, methylene diphenyl isocyanate, required to achieve a ratio of 100:20 and setting aside the determined amounts of these materials.

Then, a third material mixture comprising about 0.2 to 3 percent by weight of the starting materials was prepared by mixing a material selected from the group consisting of polystyrene pre-formed powder, sawdust or wood flour, starch or corn flour and mixtures thereof.

Thereafter, the foregoing materials were blended or mixed into a substantially homogeneous mass. Preferably, this was accomplished by mixing the above first material mixture in a suitable mixing apparatus for about 5 to 10 minutes and then adding the above third material mixture into the apparatus and continuing mixing for an additional 1 to 3 minutes. Then the organic liquid binder ("OIL-NOBAKE") was added into the apparatus and mixed with the materials therein for about 2 to 3 minutes and then the isocyanate was added, while continuing mixing for a further 1 to 2 minutes. The mixing apparatus was then stopped and a moldable mass was attained.

The moldable mass was then placed into suitable molds, for example, open-ended metallic, woor or plastic boxes (bar or pipe-type molds may also be used if desired) within about 45 minutes after mixing. The filled molds were stored at ambient room temperature for about 90 to 120 minutes whereby the moldable mass became self-sustaining, i.e. self-cured by the conventional urethane chemical reaction of the isocyanate therein.

After the self-cure process was completed, the molds were stripped from the resulting bricks and the bricks were post-cured by placing them in an oven heated at about 250° to 350° F. for about 60 minutes. After post-curing the bricks exhibited electrical conductivity and a mechanical strength sufficient to withstand about 50 to 150 pounds per square inch.

Next, the bricks were completely cured and provided with controlled porosity by a sintering process. A number of different sintering processes may be used. A preferred sintering process comprises attaching electrodes to opposite sides of each brick and providing a controlled electrical current to the electrodes so that at the start of the process, a current of about 10 to 15 V is provided and then, during each regular period, for example, during each 30 minute period, the voltage is increased 10 to 15 V until a voltage of about 80 to 120 V is attained in about 4 hours. These conditions are maintained for about 2 hours so that all or substantially all organic material within each brick is burned out and good porosity is provided. Another preferred sintering process comprises placing the post-cured bricks in a sintering furnace and heating the bricks from room temperature to about 1600° F. during a period of about 3 hours and maintaining these conditions for about 2 hours so that a complete cure and thermal decomposition of all organic materials is achieved and good porosity is attained. The sintering process preferably takes place in a protective environment which retards or prevents oxidation of materials.

After sintering, the bricks were metallized on terminal sides thereof (i.e. opposite sides), as by treatment with aluminum and were ready to be connected into a suitable electrical circuit, for example, such as illustrated at FIGS. 1 and 2.

It will be understood that variations and modifications may be effected without departing from the spirit and scope of the novel concepts of this invention.

I claim as my invention:

1. A sintered electrically resistive fluid-permeable heat generating member composed of a mixture of materials based on a starting mixture comprised of:
   about 87 to 94 percent by weight of electrically conductive particles;
   about 0.2 to 3 percent by weight of a thermally decomposable porosity control material;
   about 3 to 9.5 percent by weight of an organic binding material; and
   about 0.2 to 3 percent by weight of a foaming agent.

2. A sintered electrically resistive fluid-permeable heat generating member composed of a mixture of materials based on a starting mixture comprised of:
   A. about 87 to 94 percent by weight of said starting mixture of a first material comprised of about 80 to 95 percent by weight of silicon carbide particles and about 5 to 20 percent by weight of a mixture of carbonyl iron particles, nickel-chromium alloy particles, metallic cobalt particles and carbon particles;
   B. about 5 to 10 percent by weight of said starting mixture of a second material comprised of about 75 to 95 percent by weight of a liquid organic binder and about 5 to 25 percent by weight of an isocyanate;
   C. about 0.2 to 3 percent by weight of said starting mixture of a third material selected from the group consisting of polystyrene powder, sawdust, wood flour, starch, corn flour and mixtures thereof.

3. A sintered electrically resistive fluid-permeable heat generating member as defined in claim 2, wherein said liquid organic binder is a linseed oil based binder.

4. A sintered electrically resistive fluid-permeable heat generating member as defined in claim 2, wherein said isocyanate is methylene diphenyl isocyanate.

5. A sintered electrically resistive fluid-permeable heat generating member as defined in claim 2, which includes an electrically conductive metal layer on opposite sides thereof.

6. A sintered electrically resistive fluid-permeable heat generating member as defined in claim 5, wherein the metal layer is composed of aluminum.

* * * * *